Jan. 10, 1928.
V. B. RICE
1,656,075
BRAKE BEAM SAFETY DEVICE
Filed March 8, 1926
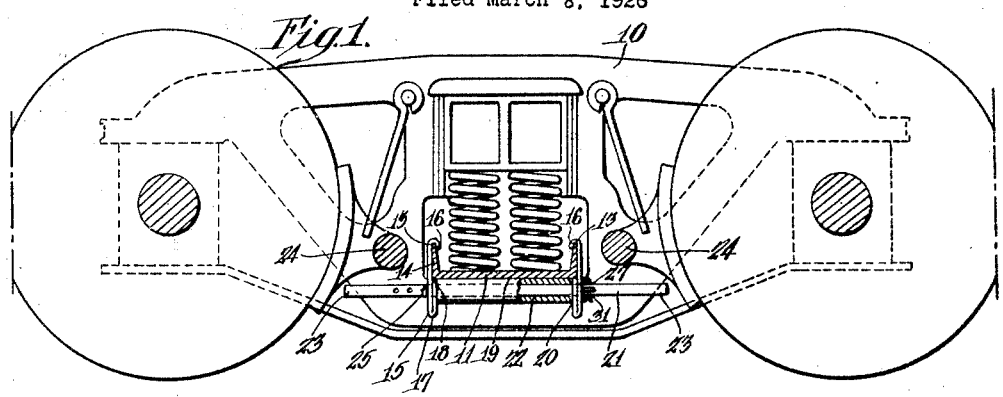
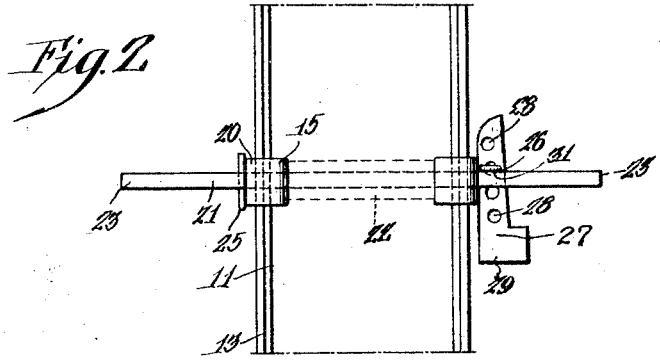
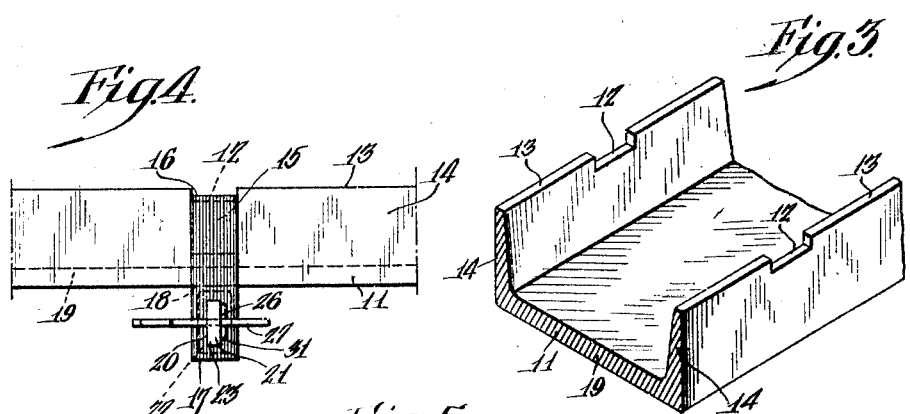
Valentine B. Rice,
INVENTOR
BY Victor J. Evans
ATTORNEY
WITNESS Patented Jan. 10, 1928.

1,656,075

UNITED STATES PATENT OFFICE.

VALENTINE B. RICE, OF BETHLEHEM, PENNSYLVANIA.

BRAKE-BEAM SAFETY DEVICE.

Application filed March 8, 1926. Serial No. 93,242.

This invention relates to an auxiliary brake beam suspension mechanism for railway trucks, and more particularly to an emergency brake beam supporting device for preventing the dropping of the brake beam to the track or road-bed in case of accidental breakage of the usual suspension means provided for brake beams. The principal object of the invention is to provide a standard railway truck with a pair of auxiliary brake beam emergency support bars which may be detachably secured to the central transverse spring seat channel plank usually associated with railway trucks, and adapted to extend forwardly and rearwardly at right angles to the spring channel plank adjacent the inner side of the truck wheels, and directly under and adjacent the usual brake carrying beams for preventing the brake carrying beams from falling down on the track or road-bed should the pivoted hangers—which ordinarily support said beams, accidentally break or become disconnected from the truck frame.

Another object of the invention is to provide an emergency brake beam supporting device as specified, which is adapted to be quickly and easily attached to the spring seat channel plank forming a part of a truck or removed therefrom with a minimum of expense, tools, or labor, a device that is adapted to be rigidly secured, regardless of the variable width of the transverse channel planks, and one that is not subject to lateral or vertical displacement after it has been secured, due to vibrations, etc.

Other objects of the invention will appear in the following detail description, and in the accompanying drawing, wherein:

Figure 1 is a side elevational view of a standard railway truck, partly in section, showing the improved brake beam safety support applied thereto.

Figure 2 is a fragmentary top plan view of one end of the spring channel frame with the device applied thereto.

Figure 3 is a detail perspective view of an end portion of the transverse channel frame showing the required cut-outs therein.

Figure 4 is an elevational view of the device per se.

Figure 5 is an assembled view in elevation of the device per se partly in section.

Referring more particularly to the drawing, the invention provided for a standard railway car truck 10 and as applied to the transverse channel 11, therefor comprises a plurality of spaced rectangular notches 12 which are cut in the top edge 13 of the upstanding side walls 14 of the channel 11, for receiving a plurality of anchoring hooks, 15 which have their upper ends 16 formed for fitment in the notches 12 and on the inner side of the upstanding side walls 14, and depend below the channel 11 with the bottom end 17 of the members 15 bent upon themselves to form a shoulder 18 for abutment against the bottom face 19 of the channel 11. The upset bottom ends 17 of the members 15, are further provided with rectangular apertures or slots 20, in which the rectangular emergency beam supporting bars 21 are loosely positioned in a horizontal spaced manner, with a spacing sleeve 22 on that portion of the bars 21 which extends between the inner sides of the anchoring members 15, and with the outer ends 23 of the bars 21, extending forwardly and rearwardly of the channel 11, so as to extend into a path directly below the brake beams 24.

In order to secure the supporting bars 21 to the anchoring members 15, with the spacing sleeve 22 between said members and the said members to the channel 11, a plurality of spaced apertures are provided in the bars 21, immediately adjacent the outer side of the member 15, to the left in Figure 1, for receiving a suitable stop bolt or heavy cotter pin 25.

Similarly, a rectangular horizontal slot 26 is provided in the opposite end portion of the bars 21 immediately adjacent the outer side of the oppositely positioned hook 15 for receiving a tapered key-head wedge 27 in a laterally extending manner, parallel with the channel 11, for rigidly locking the supporting bars 21 in the members 15, and on the channel 11. The said tapered key-head wedge 27 being provided with a plurality of spaced apertures 28 which extend from the narrow end toward the key-head 29. Said apertures being adapted to receive a heavy cotter pin 31 in one of the said apertures 28 which extend through the slot 26 to the opposite side of the bars 21 for securing the wedge 27 against working loose and the subsequent loss thereof.

From the foregoing, it will be readily apparent to those skilled in the art, that I have provided a practical, simple, and highly efficient emergency brake beam support for use on railway car trucks which is quickly and easily attached, and in like manner, removed from a truck when necessary, and while I have shown and described one practical embodiment of my invention, it is to be understood, that I do not limit myself to the exact construction as set forth, but consider myself at liberty to make such changes and modifications, as fairly fall within the scope of the appended claims.

What I claim is:

1. In combination with a railway car truck and transverse channel therefor, a plurality of supporting hooks, means for spacing said hooks on the upstanding side walls of said channel in a fixed position, the lower ends of said hooks upset to form shoulders for abutting the bottom face of said channel, a supporting bar, the upset ends of said hooks having rectangular slots for receiving said supporting bar, a spacing sleeve on said bar positioned between the oppositely disposed supporting hooks, a stop pin in the front portion of said bar for abutting the outer sides of said hooks, said bar having a slot therein adjacent the outer side of the opposite supporting hook, a tapered key-head wedge for locking fitment in said slot, said wedge having apertures for receiving a securing pin, said supporting bar extending forwardly and rearwardly in a path directly under and adjacent the brake beams of said truck.

2. The combination with a railway car truck, of a transverse channel therefor, opposite supporting hooks with means for detachably connecting their upper ends to the side walls of the channel, the lower portions of the hooks on their adjacent faces having shoulders for abutting the bottom face of said channel, a supporting bar passing through the lower parts of the hooks at points just below the shoulders, a spacing sleeve on said bar between the lower parts of the hooks at points adjacent said shoulders, and means passing through each end of said bar adjacent the outer face of the hook for preventing longitudinal movement of the bar and insuring a rigid structure depending from the channel, said supporting bar extending forwardly and rearwardly in a path directly under and adjacent the brake beams of said truck.

3. The combination with a railway car truck, of a transverse channel therefor, opposite supporting hooks having means for detachably connecting their upper ends on the side walls of the channel, the lower depending parts of the hooks being upturned upon themselves with the extremities of said upturned portions forming shoulders abutting the bottom face of said channel, a supporting bar passing through the hooks and their upturned portions, a spacing sleeve on the bar immediately under the channel and interposed between the upturned portions of the hooks, and devices engaged through the bar adjacent the remote faces of the hooks, hence preventing longitudinal movement of the bar, the latter extending forwardly and rearwardly in a path directly under and adjacent the brake beams of said truck.

In testimony whereof I affix my signature.

VALENTINE B. RICE.